(12) United States Patent
Fruth

(10) Patent No.: US 8,409,483 B2
(45) Date of Patent: Apr. 2, 2013

(54) METHODS AND APPARATUS FOR USE IN SOLID FREEFORM FABRICATION

(75) Inventor: Carl Johannes Fruth, Parsberg (DE)

(73) Assignee: Fit Fruth Innovative Technologien GmbH, Parsberg (DE)

( * ) Notice: Subject to any disclaimer, the term of this patent is extended or adjusted under 35 U.S.C. 154(b) by 195 days.

(21) Appl. No.: 13/042,964

(22) Filed: Mar. 8, 2011

(65) Prior Publication Data

US 2011/0156300 A1     Jun. 30, 2011

Related U.S. Application Data

(62) Division of application No. 12/993,230, filed as application No. PCT/EP2008/006857 on Aug. 20, 2008.

(30) Foreign Application Priority Data

May 9, 2008   (DE) .................. 10 2008 022 946

(51) Int. Cl.
    *B29C 35/02*     (2006.01)
(52) U.S. Cl. ...... 264/113; 264/308; 425/112; 425/174.4
(58) Field of Classification Search .................. None
See application file for complete search history.

(56) References Cited

U.S. PATENT DOCUMENTS

| | | |
|---|---|---|
| 4,938,816 A | 7/1990 | Beaman et al. |
| 5,647,931 A | 7/1997 | Retallick et al. |
| 5,730,925 A | 3/1998 | Mattes et al. |
| 5,731,388 A | 3/1998 | Suzuki et al. |
| 5,904,889 A | 5/1999 | Serbin et al. |
| 5,936,861 A | 8/1999 | Jang et al. |
| 6,767,499 B1 | 7/2004 | Hory et al. |
| 2004/0170765 A1 | 9/2004 | Ederer et al. |
| 2007/0267766 A1 | 11/2007 | Hesse et al. |
| 2008/0018018 A1 | 1/2008 | Nielsen et al. |

(Continued)

FOREIGN PATENT DOCUMENTS

| | | |
|---|---|---|
| DE | 44 00 523 A1 | 7/1995 |
| DE | 44 14 775 A1 | 10/1995 |

(Continued)

OTHER PUBLICATIONS

Extended European Search Report dated Oct. 5, 2001 for counterpart European patent application No. 11150236, including European Search Opinion, European Search Report, Patent Claims (in German) searched and examined in the Extended European Search Report, Translation of Claims searched and examined in Extended European Search Report, Translation of European Search Report and Translation of European Search Opinion.

(Continued)

*Primary Examiner* — Mary F Theisen
(74) *Attorney, Agent, or Firm* — J-Tek Law PLLC; Jeffrey D. Tekanic

(57) ABSTRACT

A method and apparatus are disclosed for producing a three-dimensional body consisting of individual solidified layers, whereby a coating material is disposed on one of a carrier plate and an already-solidified layer of the body in a first layer thickness by slidably withdrawing a bottom plate of a storage container filled with the coating material, thereby allowing coating material to descend from the storage container onto the carrier plate or already-solidified layer of the body. The first layer thickness of the coating material is then reduced to a lesser second layer thickness by re-inserting the bottom plate through the coating material disposed on the carrier plate or already-solidified layer. The coating material is then solidified at predetermined locations in order to generate a desired layer contour of one solidified layer of the three-dimensional body.

20 Claims, 8 Drawing Sheets

U.S. PATENT DOCUMENTS

| | | |
|---|---|---|
| 2008/0131104 A1 | 6/2008 | Philippi et al. |
| 2008/0260945 A1 | 10/2008 | Ederer et al. |
| 2009/0045553 A1 | 2/2009 | Weidinger et al. |
| 2011/0143108 A1 | 6/2011 | Fruth et al. |

FOREIGN PATENT DOCUMENTS

| | | |
|---|---|---|
| DE | 101 17 875 A1 | 1/2003 |
| DE | 10 2005 024 433 A1 | 2/2006 |
| DE | 10 2006 023 484 A1 | 11/2007 |
| EP | 1 270 185 A1 | 1/2003 |
| EP | 1439050 A1 | 7/2004 |
| EP | 1 634 693 A1 | 3/2006 |
| EP | 1439050 B1 | 8/2006 |
| KR | 2004-0101776 A | 12/2004 |
| WO | 02/45940 A1 | 6/2002 |
| WO | 03/035353 A1 | 5/2003 |
| WO | 2006/033621 A1 | 3/2006 |
| WO | 2008/028443 A2 | 3/2008 |

OTHER PUBLICATIONS

Examination Report of the EPO dated Jul. 27, 2012 for related EP application No. 08 801 638.1, including English translation of substantive portion thereof.

International Search Report for parent application No. PCT/EP2008/006857, Nov. 11, 2009.

Written Opinion for parent application No. PCT/EP2008/006857, Jan. 3, 2010.

Examination Report from German Patent & Trademark Office dated Aug. 13, 2009 for priority application No. DE 10 2008 022 946.6 (with attached English translation of substantive portions thereof).

a)

b)

c)

d)

e)

f)

g)

a)

b)

c)

METHODS AND APPARATUS FOR USE IN SOLID FREEFORM FABRICATION

CROSS-REFERENCE

This application is a divisional of U.S. patent application Ser. No. 12/993,230 filed on Mar. 1, 2011, which is the U.S. National Stage of PCT/EP2008/006857 filed on Aug. 20, 2008, which claims priority to German patent application no. 10 2008 022 946.6 filed on May 9, 2008.

TECHNICAL FIELD

The present disclosure generally relates to fibers for producing a shaped body made of individual, interconnected layers. The present disclosure further relates to a method for producing fibers and a method for producing a shaped body according to a layer-by-layer construction. Moreover, the present disclosure relates to a shaped body comprising a plurality of fibers lying one above another and interconnected with each other, as well as to the use of fibers for producing a shaped body.

BACKGROUND OF THE INVENTION

Nowadays, a wide variety of manufacturing machines having specifically-defined fabrication chambers are used for fabricating products and/or components. Often, one or more components can be produced in a single production run in the fabrication chambers of these manufacturing machines, due to the type of production method. Such methods and devices are generally known, for example, by the term "Solid Freeform Fabrication" (SFF-systems) and basically include, for example, production methods and production machines, which are able to produce three-dimensional components directly from 3D-CAD-data. This term further includes all known rapid prototyping and rapid manufacturing methods.

A common feature of all known SFF-systems is the layer-by-layer construction of a workpiece. In recent years, SFF-systems have been used, in which the individual layers are made of a powder or powder-like materials. In particular, metallic components are produced in a melting phase by laser sintering or electron beam melting. "Selective laser sintering" (SLS method) also works according to this principle. In "selective mask sintering" (SMS method), instead of a laser beam, a wide-surface radiation source, e.g., an array of infrared radiators, is used for curing and/or solidifying defined layer areas. A mask determines which areas of a layer will be cured and/or solidified and the mask has to be newly generated for each layer.

All these methods are based on initially applying a layer of loose, i.e. non-solidified, coating material, which has an accurately defined layer thickness and shaped surface (usually a planar surface). The layer-buildup methods used together with the present teachings may be, for example, the following methods: 3DP of the company Zcorp, Polyjet of the company Objet, SMS of the company Sintermask, SLS and DMLS of the company EOS, SLA as well as IMLS of the company 3D Systems, LaserCUSING of the company Concept Laser, laser melting of the company MCP, Electron Beam Melting of the company Arcam, and Electron Beam Sintering.

The above-mentioned layered construction (rapid prototyping) systems have been known for a long time for rapid and cost-effective production of prototypes or small series production. The primary application of previously-used rapid prototyping systems has been the production of components made from organic materials like polymers and waxes. Rapid prototyping systems are, however, also increasingly being used in the production of metal components. In particular, metal components are produced in a melting phase by laser sintering or electron beam melting.

In the above-mentioned methods, 3D CAD data is typically first broken up into a plurality of individual layers or vertical sections and then the workpiece built up or fabricated in the actual production process based upon these individual layers or sections. That is, body outline data must exist for each layer in all known layered construction methods for producing three-dimensional bodies. Body outline data precisely specifies in each layer, which areas of the layer have to be melted or sintered in accordance with the type of layered construction technology used. Such a method is described, for example, in WO 2005/090448 A1. In this case, a layer is produced by applying a powder layer of a predetermined thickness on a base or an already-produced layer and then selectively solidifying this powder, for example, by laser irradiation in the areas that form each layer of the shaped body, thereby bonding it with the solidified areas of the previous layer which are positioned beneath. After completion of the top layer, the non-solidified powder is removed, so that only the shaped body made of the solidified powder is left. A prerequisite for these methods is a powder as a starting material that, on the one hand, can be applied on a base in layers having a defined thickness and, on the other hand, can be selectively solidified in a well-defined manner by targeted fusing, or sintering, or by contact with a liquid that cross-links the powder, thereby undergoing a mechanical bond with the already solidified areas of a previous layer.

The production of such powders, which are, e.g., made of metals, metal alloys or thermoplastics, in particular polyamides having a long hydrocarbon chain between the amide groups, like PA 11 or PA 12, is relatively costly, because the powder particles must have dimensions (diameter, largest diameter to smallest diameter in elliptical particles, surface roughness, etc.) that are defined within narrow limits.

It is also known from WO 2005/090448 A1 to admix additives, such as glass spherules, aluminum flakes or also stiffening or reinforcing fibers, e.g., carbon, glass, ceramic, or boron fibers, into the thermoplastic powder in order to improve its mechanical characteristics, wherein the volume fraction of said additives may amount to up to 30% of the powder and wherein their length distribution is chosen such that the percentage of fibers protruding from the surface of the powder particles, into which the fibers are incorporated during production, is as small as possible. This ensures that the cross linking of powder particles and/or the solidification of the powder is not impaired during the laser irradiation.

In EP 1 058 675 B1 and U.S. Pat. No. 4,938,816, methods for laser sintering are disclosed wherein a ceramic powder or other powder is used. A device for laser sintering, in particular, metal powder is known from DE 195 14 740 C1. A device and a method for building up fluids are disclosed in DE 10 2004 008 168 A1. Finally, it is known from this prior art to compact the powder during laser sintering or to compact a layer during or prior to the solidification using the laser means in order to achieve a high volume density.

The known devices and methods may, however, have the disadvantage that the coating material forming the individual layers is expensive and, under certain circumstances, may either only function in a very narrow process window or may have a low margin of error. Further, such methods may also make particularly high demands on the materials to be used, as the forces involved in the coating process are dependent on the flowability of the powders and the viscosity of the pastes, respectively. In particular, in contrast to spherical powders, so-called irregular or fiber-shaped powders may be problematic to process using conventional devices and methods, or may not attain sufficient powder density during the coating, in order to achieve a sufficient component density during processing. Therefore, powders having spherical particle geometries are often used, which powders are frequently mixed with flow improvers, such as, for example, carbon black or $SiO_2$ in order to make these powders usable for conventional coating devices.

The known layering methods and devices may cause difficulties when the surface to be coated exhibits different states, e.g., when unhardened material and hardened material are present or when loose powder and fused powder are present.

DESCRIPTION OF THE INVENTION

In a first aspect of the present teachings, a new raw material for a shaped body made of individual solidified layers is disclosed, which may be used to partially or completely overcome one or more of the above-mentioned problems.

According to the first aspect, fibers may be used as the raw material for producing a shaped body comprised of individual interconnected layers according to a solid freeform fabrication method.

In a solid freeform fabrication method according to another aspect of the present teachings, the fibers may be spread out in layers that are substantially comprised of loose fibers, which are then interconnected in predetermined areas of a fiber layer, preferably by applying energy, thereby forming solidified areas in said fiber layer. The solidified areas of one fiber layer are preferably connected with the solidified areas of an already existing fiber layer.

In contrast to conventional powder particles that are close as possible to a spherical shape, the fibers according to the present teachings can be easily produced with precisely specified dimensions, whereby the fibers and the powder comprised thereof are cost-efficient and have specific characteristics.

In another aspect of the present teachings, the fibers preferably may be comprised of different materials and/or have differing dimensions, thus enabling precise tuning to the particular requirements.

The diameter of the fibers is, for example, between 0.001 and 0.5 mm, preferably between 0.01 and 0.1 mm. In a further aspect of the present teachings, the ratio of the average diameter to the average length of the fibers is advantageously between 0.1 and 1000, preferably between 0.5 and 3. With the stated dimensions, it is possible to apply the fibers in a homogenous, thin layer having a thickness, for example, between one and ten times the thickness of a fiber dimension, preferably the fiber diameter.

In another aspect of the present teachings, the edges of the end faces of at least some of the fiber pieces are preferably irregular and/or chamfered. This improves the mutual mechanical bonding between the fiber pieces, for example during fusing or sintering.

In another aspect of the present teachings, the fibers preferably comprise at least one of the following materials: thermoplastics such as polyamide (PA), polypropylene (PP), polylactide (PLA), polybutylene terephthalate (PBT) or polyethylene terephthalate (PET), etc.

A filler material made of particulate material, for example, may be added to the fibers, wherein the filler material particles may be embedded in the solidified areas comprised of interconnected fibers, without being fixedly connected with the fiber pieces, or may be interconnected with each other, or may be connected with the fiber pieces as well as with each other. The proportion of filler material is preferably less than 50 volume percent, so that the matrix formed by the fibers will be maintained after solidification. The filler material may be, for example, carbon black, carbon, glass, metal oxide, or ceramic. Depending on the preferred effect of the filler material, the particles of the filler material are fibrous or spherical. The dimensions of the filler material particles are advantageously between 0.005 and 0.5 mm.

In another aspect of the present teachings, a method for producing fibers is provided, wherein a material is extruded into elongated fibers. The fibers are subsequently trimmed into fiber pieces that are suitable for producing a shaped body comprised of individual interconnected layers according to a solid freeform fabrication method.

At least one rotating cutting- or impact element may be utilized for trimming the fibers.

In another aspect of the present teachings, a method for producing a shaped body according to layer-by-layer (rapid prototyping) construction is provided, wherein a fiber layer of defined thickness is applied to an existing fiber layer that is solidified in predetermined areas, wherein fiber layer itself is solidified in predetermined areas, and wherein the newly-formed, solidified areas undergo a bonding with the solidified areas of the already existing fiber layer. Accordingly, for the first time in this technical field, fibers are used as a raw material instead of the conventional materials.

In another aspect of the present teachings, a shaped body is provided, whose solidified portions are comprised of a fiber material as described above. This shaped body can be produced in a cost-effective manner with a defined and predetermined quality.

For the sake of good order, it is noted that the fibers according to the present teaching are structures having a diameter that is smaller than its length, i.e. structures which are thin in relation to their length, and which may possibly be flexible. Generally speaking, fibers are, for example, also structures whose geometrical shape results from an extruded cross-section. Basically, the fibers may be structures having a generally cylindrical shape. The basic shape of the cylinder may, however, be arbitrary; a circular cylinder merely is preferred. Slanted cylinders also fall within the present definition of fibers.

The average length and the average diameter of the fibers are preferably determined by microscopic analysis as well as optical particle measurement. Herein, e.g., the direction of extrusion, i.e. the cylinder axis, is referred to as the length, and the circumference of the cross sectional area, i.e. the base surface of a cylinder, is referred to as diameter. The average values may, for example, be calculated by summing up the measured or determined values of a defined number of fibers, and dividing the summation value by the number of measured fibers. The number of fibers may be, for example, 10, 100, 1,000, 10,000, 100,000 or more. It is explicitly noted that also all possible intermediate values are to be understood as being expressly disclosed. Finally, it is noted that known computer-aided quantitative measurements for determining the average fiber lengths and average diameters also may be used, e.g., by utilizing computer tomography.

BRIEF DESCRIPTION OF THE DRAWINGS

For further explanation and better comprehension, several exemplary embodiments of the present teachings are described and explained in more detail in the following with reference to the accompanying Figures.

DESCRIPTION OF EXEMPLARY EMBODIMENTS OF THE PRESENT INVENTION

Figure 1:
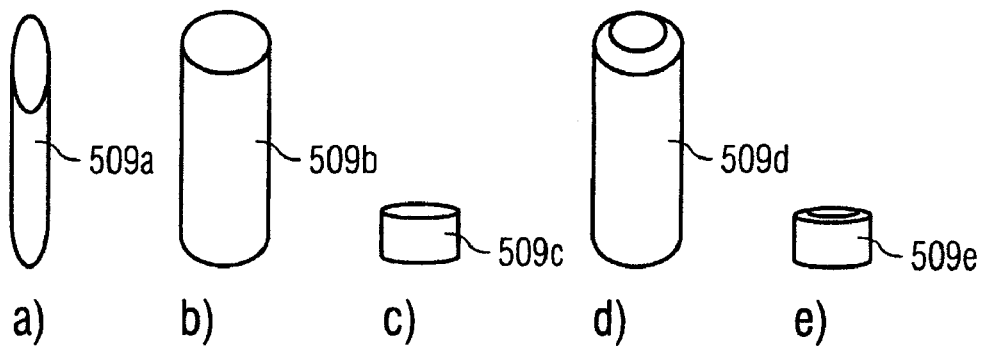
FIGS. 1a) to 1e) show perspective views of fibers which are used for the powder according to the present teachings.

According to FIG. 1, fiber pieces 9 having different cross-sectional shapes and different lengths, as well as different shapes of their end faces, may be used for the powder in accordance with certain aspects of the present teachings.

In the present application, the term "fiber" or "fiber piece" is used for a structure or particle, whose length is larger than its diameter, wherein, for example, the lateral surface is formed in certain portions with a constant profile, at least in the longitudinal direction of the fiber. The fibers are produced, for example, by extruding the fiber material through an extrusion head with openings, the shape of said openings defining the cross-section of the fibers.

FIG. 1a shows a fiber piece 509a having an elliptical cross-section, FIG. 1b shows a fiber piece 509b having a circular cross-section, the fiber piece 509c according to FIG. 1c has a shorter axial length than its diameter, and in the fiber pieces 509d, 509e according to FIGS. 1d and 1e, the respective visible end face is irregular or chamfered.

The fiber pieces 509a-509e, which are shown in an exemplary manner in FIG. 1, are produced in a generally known manner by mechanically trimming the fibers exiting the extruder, immediately after exiting from the extruder and after cooling, into fiber pieces 509a-509e having a predetermined length and having end faces formed in a predetermined manner.

Figure 2:
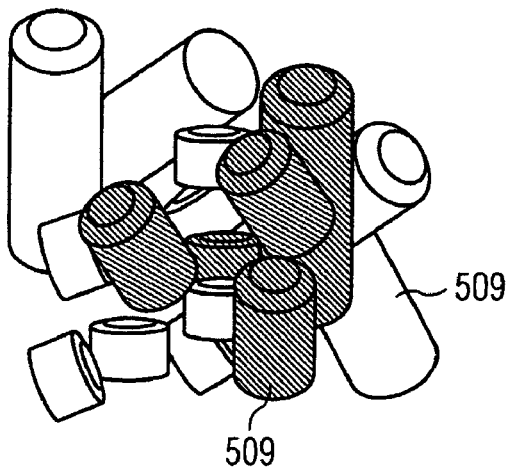
FIG. 2 shows a fiber powder comprised of different fiber pieces.

FIG. 2 shows a powder comprised of different fiber pieces 509, wherein the different fiber pieces 509 may also be made of different materials.

The fiber pieces 509a-509e, which are shown in an exemplary manner in FIG. 1, may be produced in a precisely predetermined manner with regard to their size, so that the powder according to FIG. 2 also may have a precisely predetermined constitution.

Figure 3:
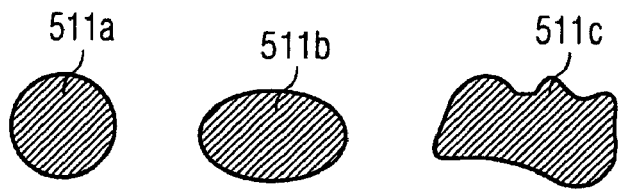
FIG. 3 shows examples of possible cross-sections of the fibers.

The diameter of the fiber pieces 509 used for the powder according to the certain aspects of the present teachings is preferably between 0.01 and 0.5 mm, more preferably between 0.01 and 0.1 mm. The ratio of the diameter to the length of the fiber pieces 509 is preferably between 0.1 and 1000, more preferably between 0.5 and 3. Exemplary cross-sections of fibers are shown in FIG. 3, e.g. circular 511a, elliptical 511b, or irregularly formed 511c.

Preferred extrudable materials for the fiber pieces 509 are, for example, thermoplastics like polypropylene or polyethylene terephthalate.

The materials are chosen with regard to the required stability and the intended solidification method for solidifying the powder comprising the fiber pieces 509.

For various reasons, such as the effect on stability, shrinkage behavior, etc., the powder may contain additives or filler material, which may also be fiber-shaped, but preferably are comprised of spherical, plate-shaped or irregular particles, in addition to the fiber pieces 509 that form the frame of the solidified area of a powder layer 519, which will be described below. Depending on the application, said fillers or additives are comprised of carbon black, carbon, glass, metal oxides, ceramics or polymer materials. Their proportion is preferably less than 50 volume percent of the powder.

Figure 4:
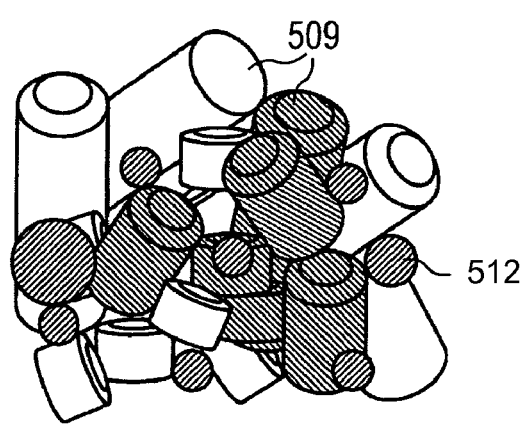
FIG. 4 shows a fiber powder comprised of fiber pieces and filler material particles.

FIG. 4 shows a powder that is comprised of different fiber pieces 509, similar to the powder of FIG. 2, and additionally comprises additives in the form of spherical particles 512.

Figure 5:
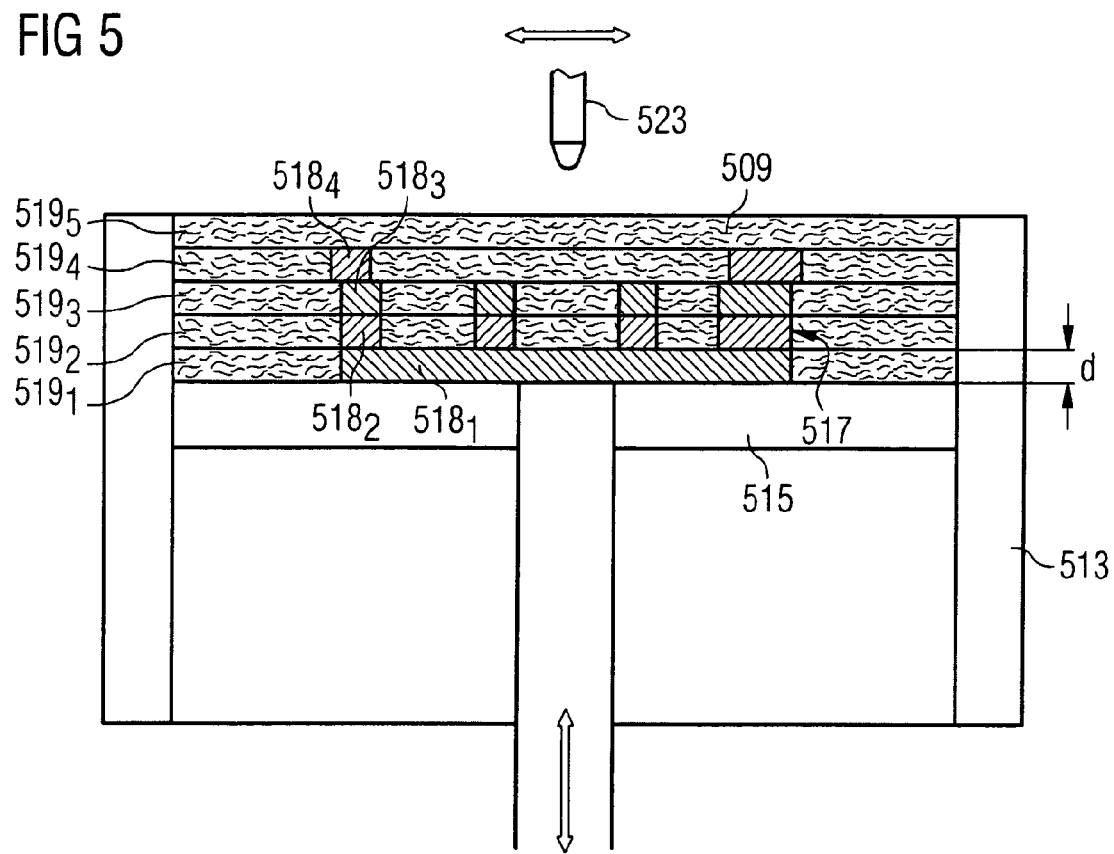
FIG. 5 shows a schematic sectional view of a device for producing a shaped body according to a layer-by-layer construction.

FIG. 5 schematically shows a cross-section through a device for producing a shaped body 517 according to layer-by-layer construction. Any powder according to the present teachings may be used in this device.

According to FIG. 5, a platform 515 is movable upwards and downwards within a cylinder 513, which is at least opened towards the top, using a not illustrated drive mechanism. The outer contour of the platform 515 is matched to the inner contour of the cylinder 513, so that the outer edge of the platform 515 is guided on the inner side of the cylinder 513.

A shaped body, denoted as a whole by 517, whose already formed portions 518 are cross-hatched, is produced in a layer-by-layer manner by disposing layers $519_1$ to $519_n$ one upon another; the layers preferably have the same predetermined thickness d.

FIG. 5 shows the shaped body 517 in the state in which four layers $519_1$ to $519_4$ are already formed, and a fifth layer $519_5$ is about to be formed. Just like the previous layers, layer $519_5$ is formed by lowering the platform 505 by a distance d within the cylinder 513 after one layer has been formed, and then filling powder into the created space using a not illustrated device in a generally known manner. The constant thickness d of the new powder layer $509_5$ may be achieved by slightly overfilling the powder and subsequently flattening the powder level to the level of the upper edge of the cylinder 513 using of a pusher, a press, etc.

Then, an irradiation device 523, e.g., a laser head radiating a focused laser beam, is controlled in accordance with CAD data of the to-be-produced shaped body 507, which data delineate the shaped body in the area of the layer $519_5$, whereby the powder is solidified in the area(s) forming the shaped body, e.g., by surface-fusing, and is left unsolidified in the remaining area(s). The solidified areas $518_1$ to $518_4$ of the layers $519_1$ to $519_4$ are cross-hatched in the illustration.

The entire shaped body 517 is constructed layer-by-layer in the above-described manner and can be removed from the tool after completion; after subsequent removal of the loose powder, it is available for further use.

Depending on the dimensions of the fiber pieces, said fiber pieces will arrange themselves more or less in parallel to the extension of the respective layer and parallel to each other when the powder is applied, wherein the parallel alignment increases with increases in the ratio between the length of the fiber piece and the diameter of the fiber piece. The layer thickness d is preferably three to five times the diameter of the largest diameter fiber pieces.

Figure 6:
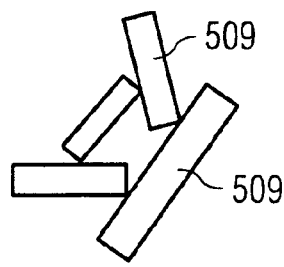
FIG. 6 shows a fiber powder comprised of fiber pieces before solidification.

FIG. 6 shows fiber pieces 509 of the powder disposed in a disordered manner prior to solidification.

Figure 7:
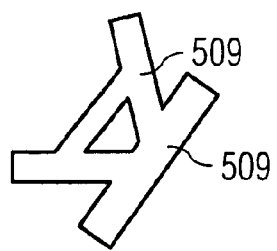
FIG. 7 shows the fiber powder of FIG. 5 after solidification.

FIG. 7 shows the fiber pieces of FIG. 6 after solidification, which solidification is effected by surface-fusing the fiber pieces 509 under the laser beam, thereby causing the fibers to fuse. As can be seen, a stable fiber frame is formed. Filler materials, if provided, are embedded or fused in the hollow spaces of the fiber frame. This type of insertion of material also allows for the formation of homogenous melted films.

By using an appropriate ratio of the length and diameter of the fiber pieces 509, wherein the fibers of the unsolidified powder are, to a large extent, arranged in parallel with each other and are parallel to the extension direction of the fibers, possibly arranged one above the other in a plurality of layers, a shaped body results that has a high volumetric efficiency of the material and good stability.

The localized solidification may also be achieved with suitable materials of the fiber pieces by selectively spraying the particular layer area to be solidified with a liquid that causes a reaction, which directly connects the fiber pieces 509 with each other and/or solidifies the layer portion, thereby connecting the fibers with each other.

A further exemplary embodiment of a method for producing a three-dimensional body 10 is shown in progressive method stages in FIGS. 8a)-8g). As shown in FIG. 8a), the body 10 is already comprised of a plurality of solidified or hardened layers 12, 14, 16, 18 which are arranged one on top of the other. Just like in the known laser-sintering method mentioned in the Background section, or according to the above-mentioned Sintermask-technology, a coating material 30, e.g., a powder, has been cured, solidified, surface-fused or fused in predetermined areas. Hence, every layer 12, 14, 16, 18 has the desired contour of the body 10 to be produced.

A vertical section of a container 20 is schematically shown in FIG. 8a). Here, the container 20 is formed as storage container, in which the loose powder 30 is stored. The container 20 has walls 22, 24 which, together with a bottom 26, form the container 20. Together with not illustrated additional container walls and the bottom 26, the container walls 22, 24 form a storage space, which may be opened to the top and in which the powder 30 to be used is stored. Alternatively, the container 20 may also be closed.

The body 10 to be produced is supported on a vertically movable carrier plate 28, which is movable upwards and downwards via not illustrated means. A source of radiation 100 is arranged above the body 10, which is only partially constructed at this stage. The source of radiation 100 may comprise, for example, an array of infrared radiators. Alternatively, it is also possible to provide a directable laser beam as the source of radiation.

In the exemplary arrangement as is shown here, a mask 112 is positioned below the source of radiation 100, which mask may be formed, for example, by printing a glass plate. The to-be-solidified areas of a layer 50 to be newly formed are left blank on this mask 112. The other areas of the glass plate are formed to be substantially impenetrable to the electromagnetic radiation of the radiation source 100, e.g. they are blackened. This embodiment therefore shows an embodiment in which the Sintermask-technology mentioned in the Background section or the SMS-technology is used.

Incidentally, in this embodiment, the carrier plate 28, together with lateral walls, forms a collection container 40, in which unsolidified coating fiber material remains above the carrier plate 28. The walls may be arranged to be stationary relative to the carrier plate 28.

Figure 8:
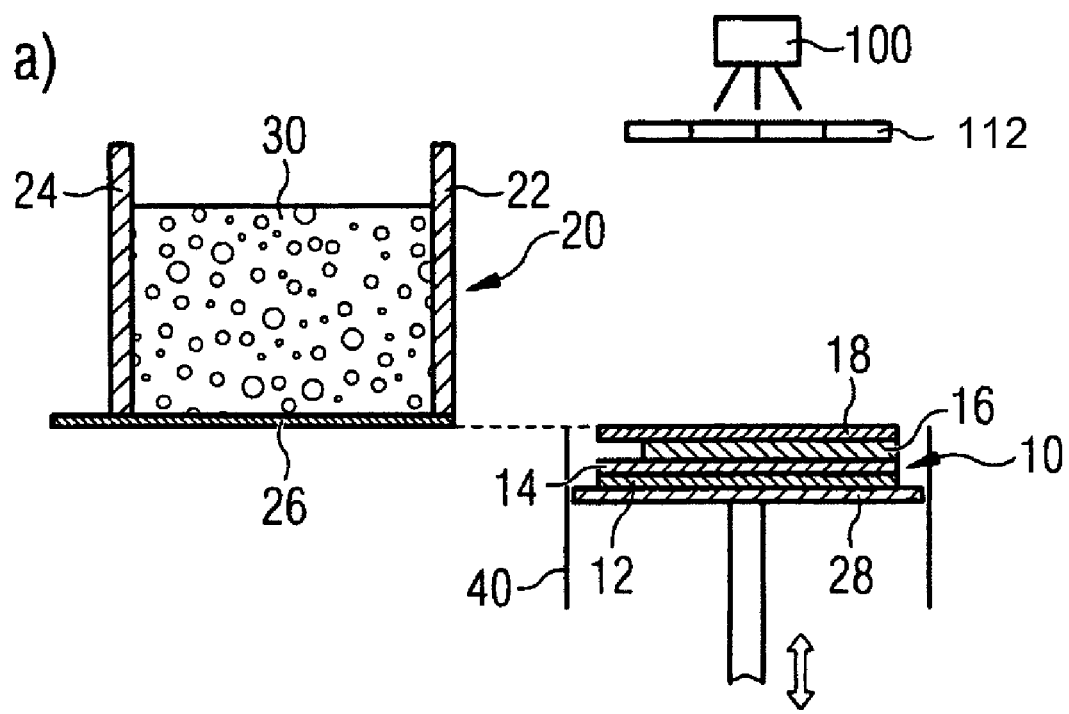
FIGS. 8a) to 8g) show a sequence of method steps according to a first exemplary embodiment of the present teachings for producing a shaped body comprised of a plurality of fiber layers.
Figure 8:
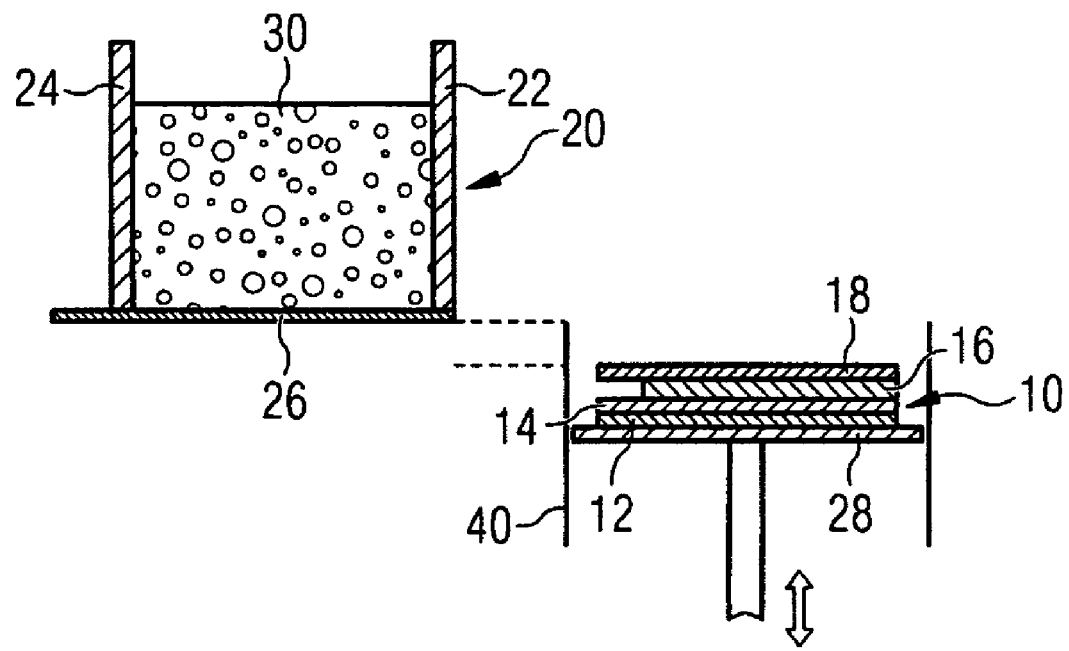
Figure 8:
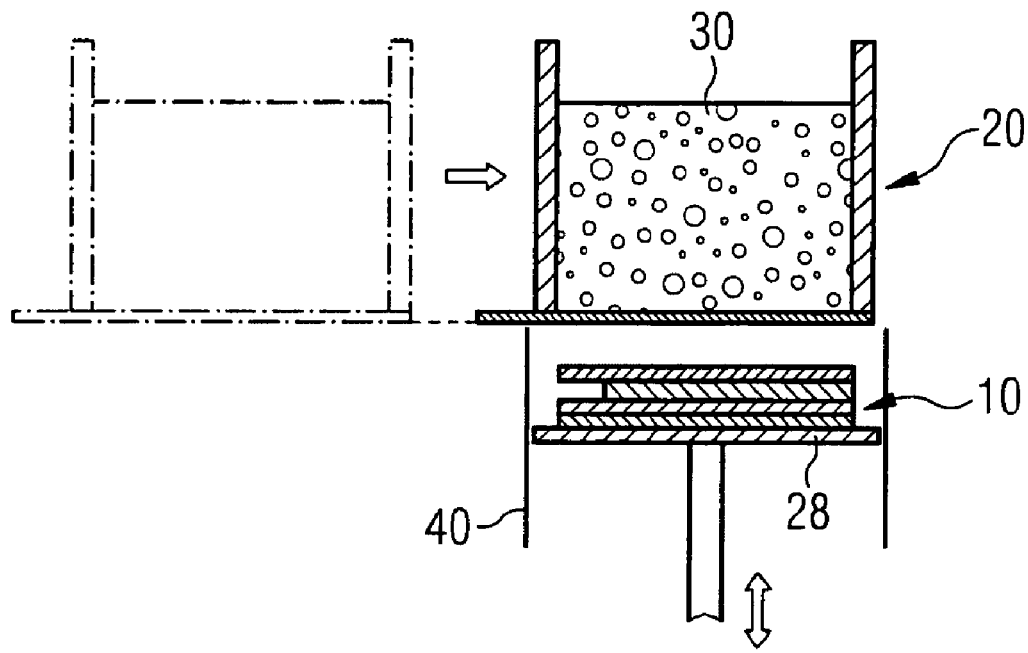
Figure 8:
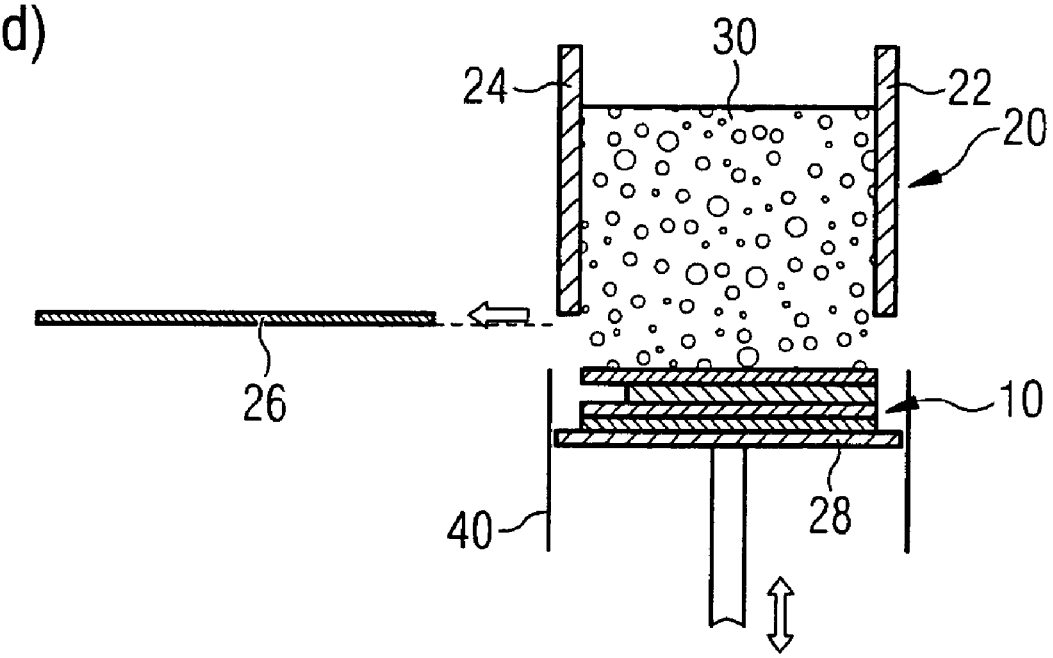
Figure 8:
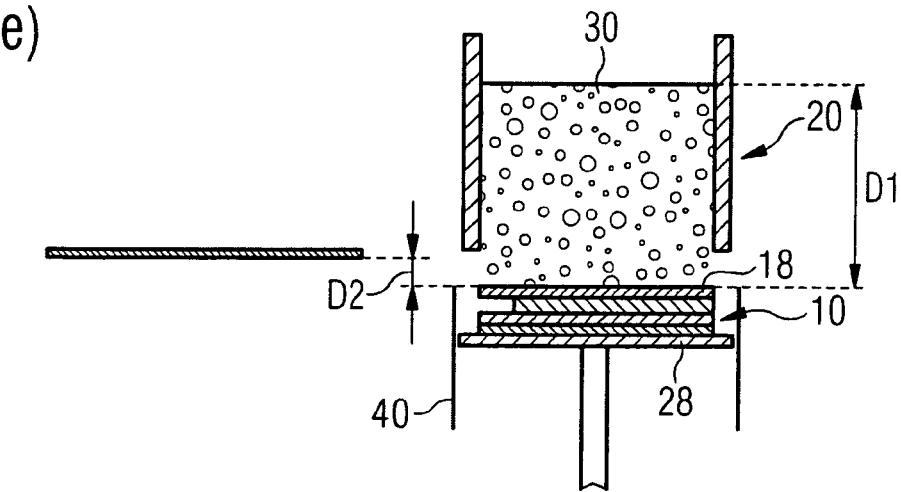
Figure 8:
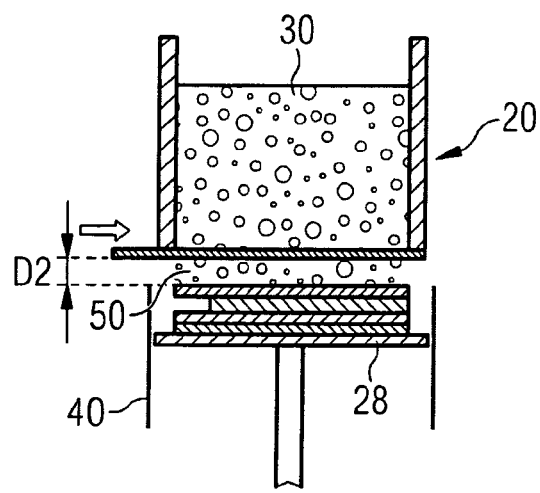
Figure 8:
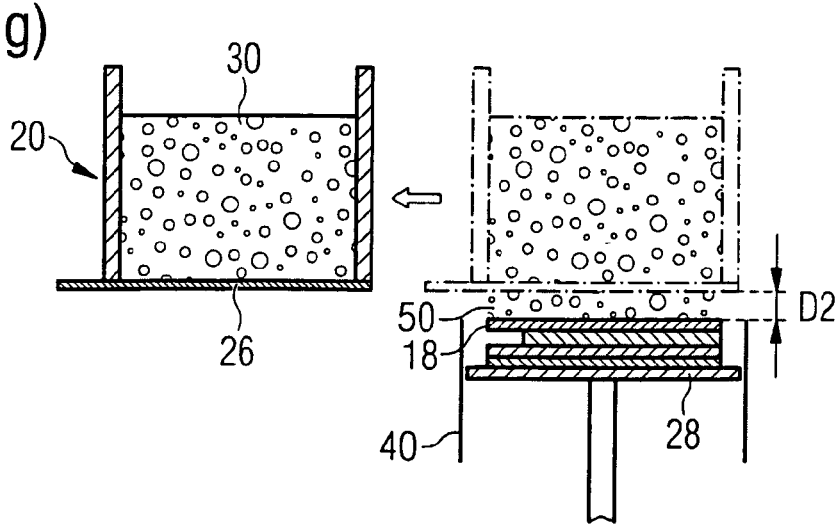

It is apparent from the subsequent sequences of FIGS. 8b)-8g) that the container 20 is movably supported, in particular horizontally movable in the illustrated views according to FIG. 8, i.e. it is movable from lateral to the body 10 to above the body 10. Moreover, the container bottom 26 is movably supported relative to the walls 22, 24.

According to the view of FIG. 8a), the layer 18 of the body 10 to be produced has been hardened and/or solidified using known techniques. In order to produce a new fiber layer 50, the carrier plate 28 with the already produced and hardened fiber layers 14, 16, 18 is then moved downwards by a predetermined distance. This step is illustrated in FIG. 8b).

As shown in FIG. 8c), the container 20 is now moved over the most recently formed fiber layer 18. Thereafter, according to the illustration of FIG. 8d), the container bottom 26 is pulled out towards the left side. As a result, the fiber powder 30 slides downwards in the container 20 and covers the most recently formed fiber layer 18. This stage of the method is also shown in FIG. 8e) in more detail. By pulling or pushing out the container bottom 26, a fiber layer 50 comprised of loose fibers, and having a large thickness D1, is thus achieved, which thickness is higher or thicker than the actual fiber layer thickness D2 to be produced.

Then, the bottom plate 26 is inserted in the step according to FIG. 8f), whereby a layer thickness D2 is achieved. D2 is the final fiber layer thickness if no pressing and/or compacting takes place after the insertion of the separating element 26. In other words, in the exemplary procedure illustrated in FIG. 8, a fiber layer 18 of material 30 to be solidified is first formed on the most recently prepared layer. The fiber layer 18 has a higher layer thickness than is desired for the final layer thickness D2. By inserting the bottom 26 again underneath the container 20, the layer thickness D2 of the fiber layer 50 to be newly produced is achieved. This is particularly clear from FIG. 8f).

In the step according to FIG. 8g), the container 20 with the inserted separating element 26 is then moved back to the left starting position. After removing the container 20 together with the bottom plate 26, which bottom plate functions as a separating element in this case, the new fiber layer 50 having the desired layer thickness D2 is formed on the most recently solidified fiber layer 18. Now, desired selective solidification and/or hardening of the loose fiber coating material 30 of the fiber layer 50 may be carried out using the radiation source 100 mentioned above. Then, additional fiber layers of the body 10 to be produced may be formed by a new sequence of the process steps according to FIGS. 8a)-8g).

A possible alternative embodiment may also provide a further step, wherein the carrier plate 28 is moved slightly upwards between the step of FIG. 8f) and the step of FIG. 8g), thereby compacting the prepared fiber layer 50, because the bottom 26 is still located above the fiber layer 50. Alternatively, the container 20 may be moved downwards by a defined distance in order to compact the fiber layer 50 to the predetermined final layer thickness D2.

After the optional compacting step is completed, the container 20 is moved back as illustrated in FIG. 8g). This possible special case of an embodiment for producing a three-dimensional body 10 may be advantageous for certain fiber materials, in particular in order to achieve a higher density in the layer 50 to be prepared.

It is common to the above-described methods for producing a three-dimensional body 10 of plural fiber layers 12, 14, 16, 18 that, for the first time, when preparing the final fiber thickness D2 of the fiber layer 50 to be produced, the forces acting on the fiber layer 50 to be produced, as well as the underlying layer 18, and, possibly, on the further fiber layers 12, 14, 16, are lower than before. Therefore, problems that may possibly occur under certain circumstances can be avoided.

FIGS. 9a)-9c) show an alternative embodiment of a method and device for producing a three-dimensional body 10 according to the invention. Here, a container 20, 20' is provided on each of the right side and the left side of the body 10 to be produced. Basically, such a container 20, 20' may be formed like the container 20 according to FIG. 8. In a first step, one of the containers 20, in this case the container 20' on the right side according to FIG. 9a), is moved over the body 10 to be produced. Then, the bottom plate 26' of this container is removed according to FIG. 8d). Hence, this method step according to FIG. 9c) corresponds to the stage of the method shown in FIG. 8d). The further method steps may now be carried out according to FIG. 8e)-8g). Accordingly, reference is made to the above embodiments and explanations.

Subsequently, the container 20', which is located on the right side, may be moved back over the body 10 to be produced, or the other container 20, which is located on the left side, may be moved over the layered body 10 in order to generate another layer 50 in the above-explained manner. In the embodiment shown in FIG. 9, it is advantageous that the containers 20, 20' may contain different materials, so that a body 10 made of fiber layers comprised of different fiber materials can be produced according to the method shown herein.

Figure 10:
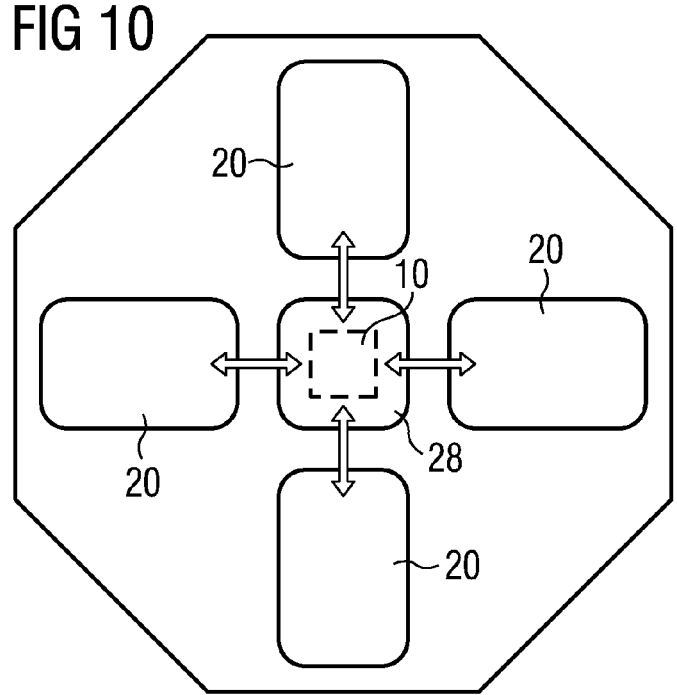
FIG. 10 shows an exemplary embodiment of a device according to the present teachings with a plurality of material application and reducing devices.

In principle, it is also possible to provide more than two containers 20, 20' with different fiber materials 30. In FIG. 10, for example, an embodiment with four containers 20 is shown that respectively contain different fiber materials. Here, each container may be moved relative to the layer body 10 to be produced. The arrangement according to FIG. 10 is quite compact. According to the illustration of the embodiment shown in FIG. 10, it is, therefore, possible to produce a body 10 made of four different materials. In particular, bodies 10 adapted to ambient conditions can be created with specific characteristics in defined portions of different fiber layers 12, 14, 16, 18, 50.

Figure 11:
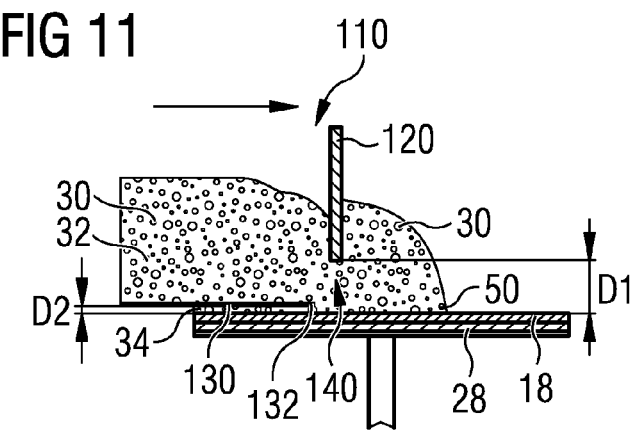
FIG. 11 shows a further exemplary embodiment of a combined application and reducing device.

In principle, the duration of the process for producing the three-dimensional body 11 can also be kept short by a method according to the present teachings, despite, for example, the use of different fiber materials, because only different containers 20 containing the different materials 30 have to be moved over the body 10 to be produced. FIG. 11 shows an exemplary embodiment of a combined material application and reducing device as may be used in a method according to the invention. Like in the previously explained embodiment, a height-adjustable carrier 28 is provided, on which the body 10 to be produced will be formed. In the embodiment shown here, one fiber layer 18 of the body 10 to be produced is already formed on the carrier plate 28. Then, the combined material application and reducing device 110 is moved over the body 10 to be produced from the left side. Here, fiber powder 30 in a large thickness D1 is located below a vertical plate 120, which leaves a gap 140 between the previously generated layer 18 and a lower edge. This gap 140 has a width larger than the layer thickness D2 to be produced at the end of the application process. A horizontal separating plate 130 is disposed behind the vertical separating plate 120. It defines the desired final layer thickness D2.

This separating plate 130 has a narrow leading edge 132 in order to divide the coating material 30, which is applied in a large thickness D1 onto the already generated fiber layer 18, into an upper portion 32 and a lower portion 34. Here, substantially only vertical forces are acting, but no shearing forces are acting that might be disadvantageous not only for the fiber layer 50 to be produced, but also for the already produced fiber layer 18. The coating material 32, which is located above the separating plate 130, can not apply any forces onto the already produced fiber layers 18 or the fiber layer 50 to be produced, due to the design of the separating plate 130. At the same time, a flawless upper surface and layer thickness D2 can be generated on the bottom side of the separating element 130 due to optional special sliding properties.

That is, in the embodiment according to FIG. 11, which is shown here, this combined material application and reducing device 110 is moved so far to the right that a defined layer of non-solidified fibers is generated across the entire carrier 28. Then, the required solidification can take place at predetermined locations of the fiber layer 50. Subsequently, a further container may be correspondingly moved over the carrier 28, or, for example, the unit 110 may be turned and then moved from the right side shown in FIG. 11 to the left side in order to generate a new fiber layer 50. In principle, it is also possible to move such a unit 110 on a circular path. In this case, after application of the fiber layer 50, the fiber layer 50 would be exposed in order to be solidified in the desired, known manner. After completion of one full revolution, the unit 110 would return in order to prepare a new fiber layer 50. Incidentally, it is noted that, after solidifying the fiber layer 50, the carrier 28 is, of course, moved downwards by the desired layer thickness D2, so that a new fiber layer 50 may be produced using the unit 110.

Figure 12:
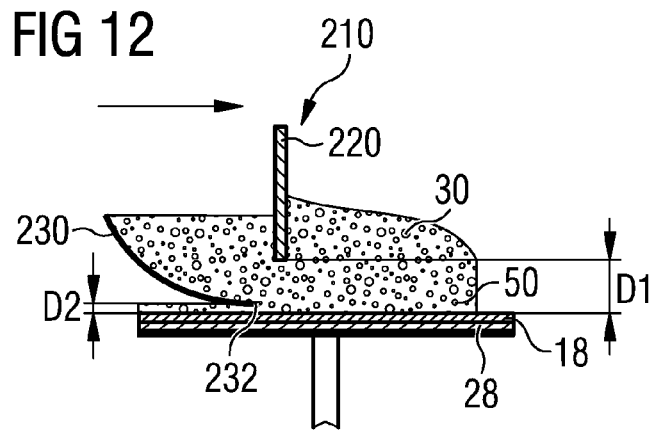
FIG. 12 shows a further exemplary embodiment of a part of a device according to the present teachings having a combined material application and reducing device.

FIG. 12 shows an embodiment of a unit 210 very similar to FIG. 11, which basically corresponds to the unit 110. Instead of the flat separating plate 130, the separating plate 230 is curved upwardly in this case. Thus, it can be achieved that, immediately after applying the material 30 at the leading edge 232, the material 30 (in this case the fibers) of the fiber layer 50 to be generated no longer slides along the bottom side of the separating device 230. Possible adhesion, etc., can be thereby avoided. However, at the same time, under certain circumstances the coating material 30 located above the curved separating plate 230 are prevented from exerting forces onto the fiber layer 50 to be produced or onto fiber layers 18 that are positioned below, etc. Apart from that, the design of the unit 210 according to FIG. 12 is implemented identical to the design of the unit 110. It also is provided with a vertical separating wall 220.

Figure 13:
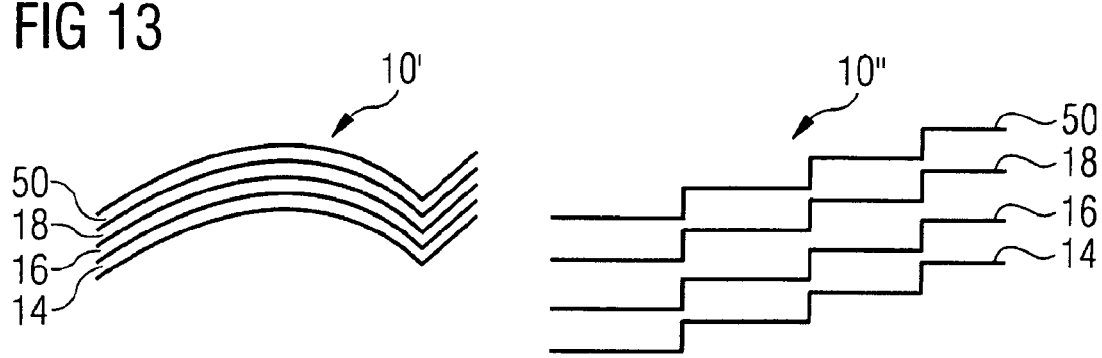
FIG. 13 shows a plurality of exemplary, schematically-illustrated cross-sectional views of surface shapes of coated material after the reducing step according to an exemplary embodiment for producing a shaped body comprised of a plurality of fiber layers.

FIG. 13 shows exemplary surface layer shapes. In accordance with the above illustrated method, it is easy to generate not only planar new fiber layers 50 having a defined layer thickness D2, but also wave-like or serrated new fiber layers 50, which then lead to bodies 10', 10" that have no individual planar fiber layers 12, 14, 16, 18, 50, but rather have stepped or wave-like surface shapes.

Figure 14:
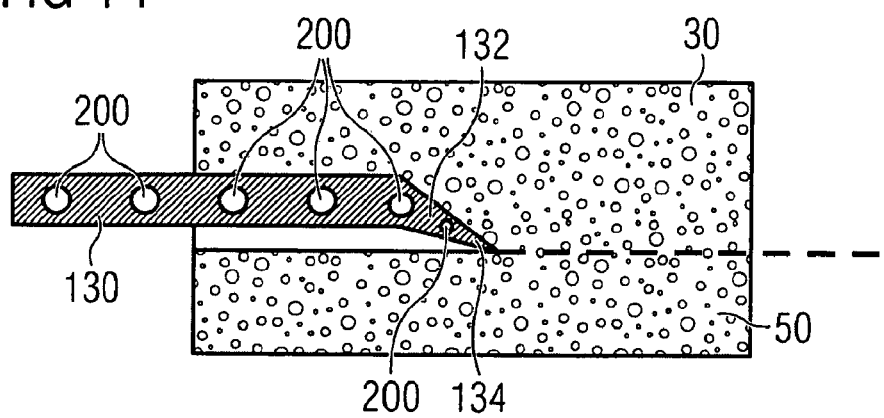
FIG. 14 shows a schematic cross-sectional view of part of a method according to the present teachings for reducing the thickness of a first layer.

FIG. 14 shows other possible separating devices, in this case the plate 130, which may be used, for example, in the embodiments according to FIGS. 11 and 12. In this case, the separating element 130 has a leading edge 132, which ends in particular in an extremely thin cutting edge 134, so that a problem-free separation of the material 30 can take place, thereby producing the layer 50 to be newly generated with a defined layer thickness D2. In this exemplary embodiment of the plate 130, the cutting edge 134 has an undercut, so that the material of the new layer 50 no longer slides along the plate 130 or the leading edge 132 directly behind the cutting edge 134, whereby detachment problems that may occur under certain circumstances are avoided.

It is noted that, in an exemplary embodiment, cooling elements such as, for example, cooling lines 200 are provided in the separating element 130 and/or in the cutting edge 134, in order to achieve adequate cooling of a layer 50 to be solidified. Here, for example, meandering cooling lines 200 are formed within the separating element 130. A cooling medium, such as e.g. water or other fluids, flows through the cooling lines 200. The cooling lines 200 are integrated into a (not illustrated) cooling circuit with corresponding elements.

Alternatively, a suitable design can also be provided for evenly heating the separating element 130 and/or the cutting edge 134. A combination of cooling and heating elements 200 within the separating element 130 is also conceivable. For this reason, either a cooling or heating fluid may be pumped through the lines 200.

Figure 9:
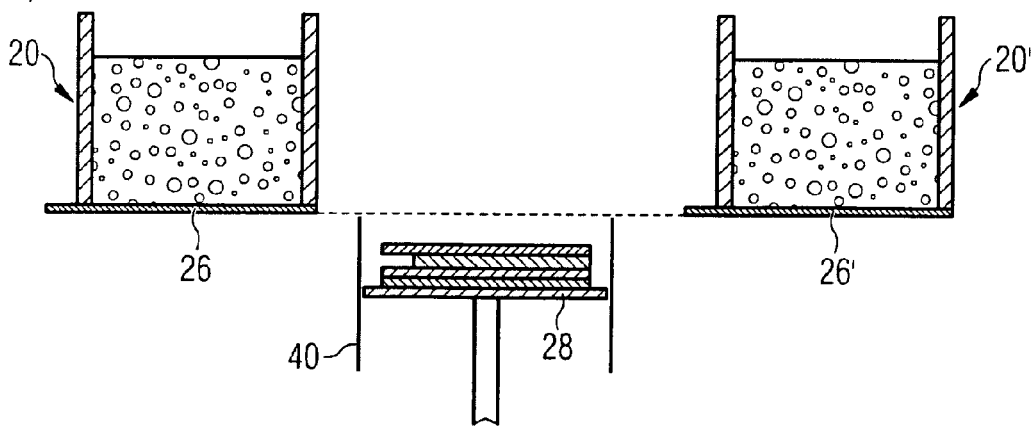
FIGS. 9a) to 9c) show a sequence of method steps according to a second exemplary embodiment for producing a shaped body comprised of a plurality of fiber layers.
Figure 9:
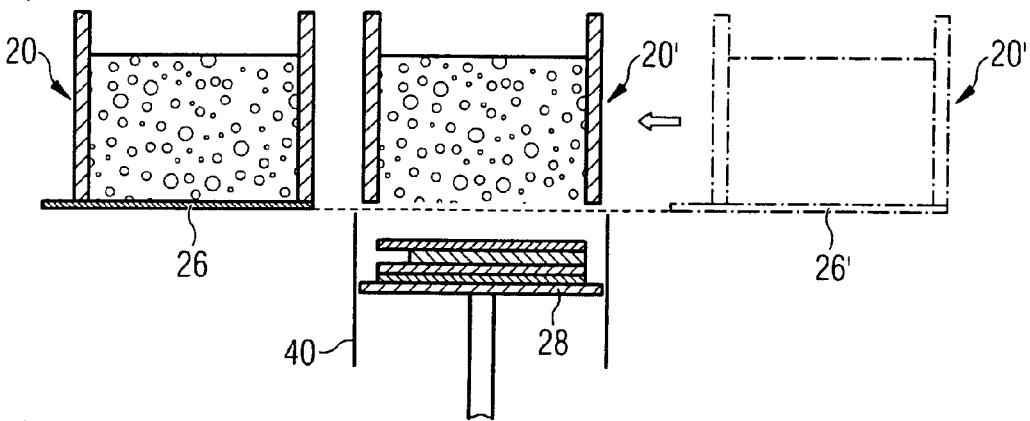
Figure 9:
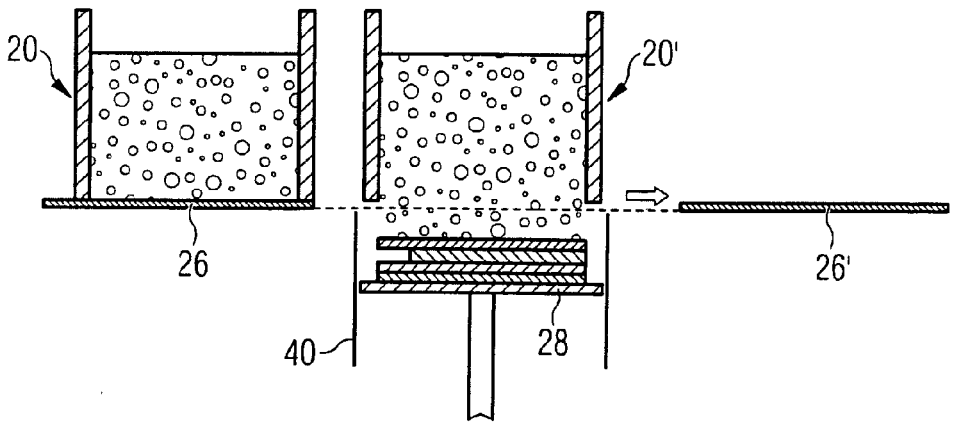
Figure 15:
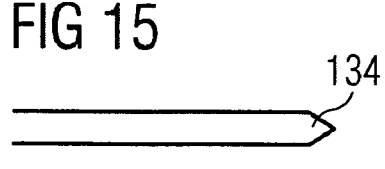
FIGS. 15-18 show exemplary cross-sectional shapes of reducing devices, alternatively combined with smoothing devices, for use in embodiments according to the present teachings.
Figure 16:
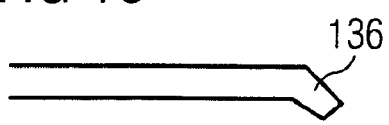
Figure 17:
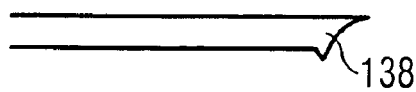
Figure 18:
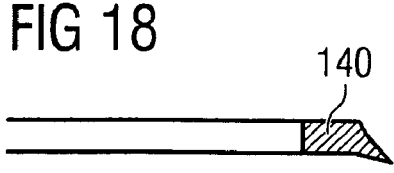

FIGS. 15 to 18 show further exemplary embodiments of leading edges of separating elements, which may be used, for example, in the units 110, 210 according to FIGS. 11 and 12, but also in the devices according to FIGS. 9 and 10. FIG. 15, for example, shows a design having an edge or cutting edge 134 that has upper and lower sides forming a tip. FIG. 16 has a design similar to that of FIG. 14, wherein the leading edge is formed slightly different, i.e. with a tip that is inclined towards the front and with an undercut. FIG. 17 shows a design having an undercut, wherein a separating surface and a slight sliding edge 138 are provided at the front edge. Finally, FIG. 18 shows a design of the front edge 140 for a separating element 130, which arrangement is very similar to FIG. 14.

Additional embodiments disclosed herein include:

1. Fibers (509) that are formed for producing a shaped body (10; 517) according to a solid freeform fabrication method, the shaped body being comprised of individual, interconnected layers (14, 16, 18; 519).

2. The fibers according to embodiment 1, characterized in that the fibers (509) are formed such that they adhere, fuse, or react with each other at least at segments of the fibers by selective application of energy, e.g., by irradiation, or by a reactive means.

3. The fibers according to one of the preceding embodiments, characterized in that the fibers (509) are made of different materials and/or have different dimensions.

4. The fibers according to one of the preceding embodiments, characterized in that the average diameter of the fibers (509) is between 0.001 mm and 0.5 mm, preferably between 0.01 mm and 0.1 mm.

5. The fibers according to one of the preceding embodiments, characterized in that the ratio of average diameter to average length of the fibers (509) is between 0.1 and 1000, preferably between 0.5 and 3.

6. The fibers according to one of the preceding embodiments, characterized in that the fibers (509) at least partially have end faces that are irregular at the edges.

7. The fibers according to one of the preceding embodiments, characterized in that the fibers (509) contain at least one of the following materials: thermoplastics such as PP, PET, PEEK, PA, PLA, ABS, PC and PBT.

8. The fibers according to one of the preceding embodiments, characterized that at least one filler material (511) is admixed with the fibers (509).

9. The fibers according to embodiment 8, characterized in that the proportion of the at least one filler material (511) is less than 50 volume percent.

10. The fibers according to embodiment 8 or 9, characterized in that the filler material (511) contains at least one of the following materials: carbon black, carbon, glass, metal oxide, ceramic.

11. The fibers according to one of embodiments 9 to 11, characterized in that the filler material (511) is not fiber-shaped.

12. The fibers according to embodiment 12, characterized in that a maximum dimension of a filler material particle (511) is between 1 nm and 100 μm.

13. A method for producing the fibers according to one of embodiments 1-12, comprising at least the following method steps:
   forming a material suitable for producing a shaped body (10; 517) according to a solid freeform fabrication method into an elongated fiber shape, which has an average diameter of between 0.001 mm and 0.5 mm, preferably between 0.01 mm and 0.1 mm,
   trimming the elongated fiber shape into fiber pieces (509), which are suitable for producing a shaped body (10; 517) comprised of individual, interconnected layers (14, 16, 18; 519) according to a solid freeform fabrication method.

14. The method according to embodiment 13, characterized in that the trimming is performed such that the ratio of average diameter and average length of the fiber pieces (509) is between 0.1 and 1000, preferably between 0.5 and 3.

15. The method according to embodiment 13 or 14, characterized in that at least one rotating cutting or impact element is used for trimming the fibers (509).

16. A method for producing a shaped body (10; 517), wherein
   individual, loose fibers (509) are spread in a defined layer thickness for forming a fiber layer (14, 16, 18; 519),
   energy is selectively applied to the prepared fiber layer (14, 16, 18; 519), so that loose fibers (509) in the fiber layer (14, 16, 18; 519) undergo a connection to each other in predetermined areas (520), at least in segments of fiber, thereby forming solidified portions in said fiber layer (14, 16, 18; 519), and these solidified areas of the fiber layer (14, 16, 18; 519) are connected with the solidified areas of an already-existing, adjacent fiber layer (19), and
   the above method steps are repeated until a three-dimensional shaped body (10; 517), which is formed in layers with the desired contour, is produced.

17. The method for producing a shaped body (10; 517) according to embodiment 16, characterized in that fibers (509) are used, which are formed according to one or more of embodiments 1-12.

18. The method for producing a shaped body (10; 517) according to embodiment 16 or 17, characterized in that the fibers (509) are formed such that they adhere, fuse, or react with each other, at least in segments of the fiber, by selectively applying energy or by reactive means.

19. A shaped body comprising a plurality of fiber layers (14, 16, 18; 519) made of fibers that lie on each other and are connected with each other according to one or more of embodiments 1-12.

20. Use of fibers (509) for producing a shaped body (10; 517) comprised of individual, interconnected layers (14, 16, 18; 519) according to a solid freeform fabrication method.

21. The use of fibers according to embodiment 20, characterized in that the fibers (509) are formed such that they adhere or fuse with each other, at least in segments of the fiber, when energy is selectively applied.

The invention claimed is:

1. A method for producing a three-dimensional body consisting of individual, connected solidified layers comprising:
   (i) disposing a coating material on one of a carrier plate and an already-solidified layer of the body by slidably withdrawing a bottom plate of a storage container filled with the coating material, whereby coating material descends from the storage container onto the carrier plate or the already-solidified layer of the body in a first layer thickness,
   (ii) reducing the first layer thickness of the coating material to a lesser second layer thickness by re-inserting the bottom plate through the coating material disposed in step (i),
   (iii) solidifying the coating material remaining on the carrier plate or the already-solidified layer after step (ii) at one or more predetermined locations in order to generate a desired layer contour of one solidified layer of the three-dimensional body; and
   (iv) repeating steps (i) to (iii) until the three-dimensional body is formed into a predetermined three-dimensional shape.

2. The method according to claim 1, wherein step (ii) comprises moving the bottom plate substantially in parallel with an upper surface of the carrier plate or the already-solidified layer of the body.

3. The method according to claim 1, wherein, in step (ii), coating material located above the second layer thickness is returned into the storage container.

4. The method according to claim 1, wherein steps (i) and (ii) are carried out in a single cycle.

5. The method according to claim 1, further comprising repeating steps (i) to (iii) with a different coating material during the production of the three-dimensional body, wherein the three-dimensional body comprises at least two different individual layers containing different solidified coating materials.

6. The method according to claim 1, further comprising compacting the coating material after step (ii) and prior to step (iii).

7. The method according to claim 6, wherein the coating material is compacted using one of the bottom plate and a separating plate.

8. The method according to claim 7, wherein coating material is compacted by downwardly moving the bottom plate or the separating plate against the coating material.

9. The method according to claim 7, wherein coating material is compacted by upwardly moving the carrier plate and the coating material against the bottom plate or separating plate.

10. The method according to claim 9, wherein the coating material is compacted by a leading edge of the bottom plate or separating plate.

11. The method according to claim 1, further comprising at least one of heating and cooling the coating material during or after step (ii).

12. The method according to claim 11, wherein the coating material is heated or cooled via the bottom plate or separating plate.

13. The method according to claim 1, wherein the coating material substantially comprises a powder.

14. The method according to claim 1, wherein the coating material comprises at least 50 volume percent of surface-fusable fibers.

15. The method according to claim 14, wherein:
   step (ii) comprises moving the bottom plate substantially in parallel with an upper surface of the carrier plate or the already-solidified layer of the body,
   in step (ii), coating material located above the second layer thickness is returned into the storage container, and
   step (iii) comprises laser-sintering the surface-fusable fibers, and
   the method further comprises:
   compacting the coating material after step (ii) and prior to step (iii) by moving one of the bottom plate and a separating plate relative to the carrier plate, and
   at least one of heating and cooling the coating material during or after step (ii) via the bottom plate or separating plate.

16. An apparatus configured to produce a three-dimensional body consisting of individual, connected solidified layers, comprising:
   a carrier plate configured to support the three-dimensional body during its production;
   at least one storage container including a slidable bottom plate configured to:
      dispose a first layer thickness of coating material contained in the storage container onto one of the carrier plate and an already-solidified layer of the three-dimensional body when the bottom plate is pulled out, and
      reduce the coating layer disposed on the carrier plate or already-solidified layer to a lesser second thickness when the bottom plate is re-inserted; and
   a solidification device configured to solidify the coating material disposed on the carrier plate or already-solidified layer at one or more predetermined locations in order to generate a desired layer contour of one solidified layer of the three-dimensional body.

17. The apparatus according to claim 16, wherein the apparatus comprises a plurality of storage containers, each containing a different coating material and each including a slidable bottom plate configured to:
   dispose a first layer thickness of coating material contained in the respective storage container onto one of the carrier plate and an already-solidified layer of the three-dimensional body when the bottom plate is pulled out, and
   reduce the coating layer disposed on the carrier plate or already-solidified layer to a lesser second thickness when the bottom plate is re-inserted.

18. The apparatus according to claim 16, wherein the at least one storage container is movably supported relative to the carrier plate.

19. The apparatus according to claim 16, wherein the carrier plate is vertically movable relative to the bottom plate.

20. The apparatus according to claim 16, wherein the bottom plate includes at least one cooling element.

\* \* \* \* \*